(12) United States Patent
Desmarais et al.

(10) Patent No.: US 7,461,866 B2
(45) Date of Patent: Dec. 9, 2008

(54) HEIGHT ADJUSTER WITH RETURN SPRING

(75) Inventors: Robert J. Desmarais, Lake Orion, MI (US); Richard W. Koning, Yale, MI (US); David R. Arnold, Macomb, MI (US); Lawrence M. Refior, Romeo, MI (US); Steven R. Bell, Rochester Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 392 days.

(21) Appl. No.: 11/183,460

(22) Filed: Jul. 18, 2005

(65) Prior Publication Data

US 2007/0013185 A1    Jan. 18, 2007

(51) Int. Cl.
*B60R 22/20* (2006.01)
(52) U.S. Cl. .................................. 280/801.2
(58) Field of Classification Search .............. 280/801.2, 280/804

See application file for complete search history.

(56) References Cited

U.S. PATENT DOCUMENTS

| | | | | |
|---|---|---|---|---|
| 4,624,479 A * | 11/1986 | Grunewald | .............. | 280/801.2 |
| 4,652,012 A * | 3/1987 | Biller et al. | .............. | 280/801.2 |
| 4,907,821 A * | 3/1990 | Fohl | .................. | 280/801.2 |
| RE33,398 E * | 10/1990 | Grunewald | .............. | 280/801.2 |
| 5,366,243 A | 11/1994 | Ray | | |
| 5,779,273 A | 7/1998 | Schmidt | | |
| 5,782,491 A * | 7/1998 | Patel | .................. | 280/801.2 |
| 5,794,977 A | 8/1998 | Frank | | |
| 6,186,548 B1 | 2/2001 | McFalls | | |
| 7,232,154 B2 * | 6/2007 | Desmarais et al. | ....... | 280/801.2 |
| 2005/0253366 A1 * | 11/2005 | Uno et al. | .............. | 280/730.2 |

* cited by examiner

*Primary Examiner*—Paul N. Dickson
*Assistant Examiner*—Joselynn Y. Sliteris
(74) *Attorney, Agent, or Firm*—Markell Seitzman

(57) ABSTRACT

A height adjuster (200) for a vehicle safety restraint comprising: a rail (230) for providing a vertical path guide for a carrier (220); the carrier (220) configured to be vertically movable along the rail to one of a plurality of locations, the carrier also configured to rotationally support the web guide (210). The height adjuster also comprises a lock mechanism (240) movable between a locked and an unlocked condition, when in a locked condition the carrier is prohibited from moving down the rail and when in an unlocked condition the carrier is free to be moved; and a return spring mechanism (300) comprising a coiled return spring having an interior or coiled end (372) and a distal end (376), the interior end configured not to rotate as the carrier is moved and a distal end of the return spring secured to one of the carrier and release mechanism.

9 Claims, 7 Drawing Sheets

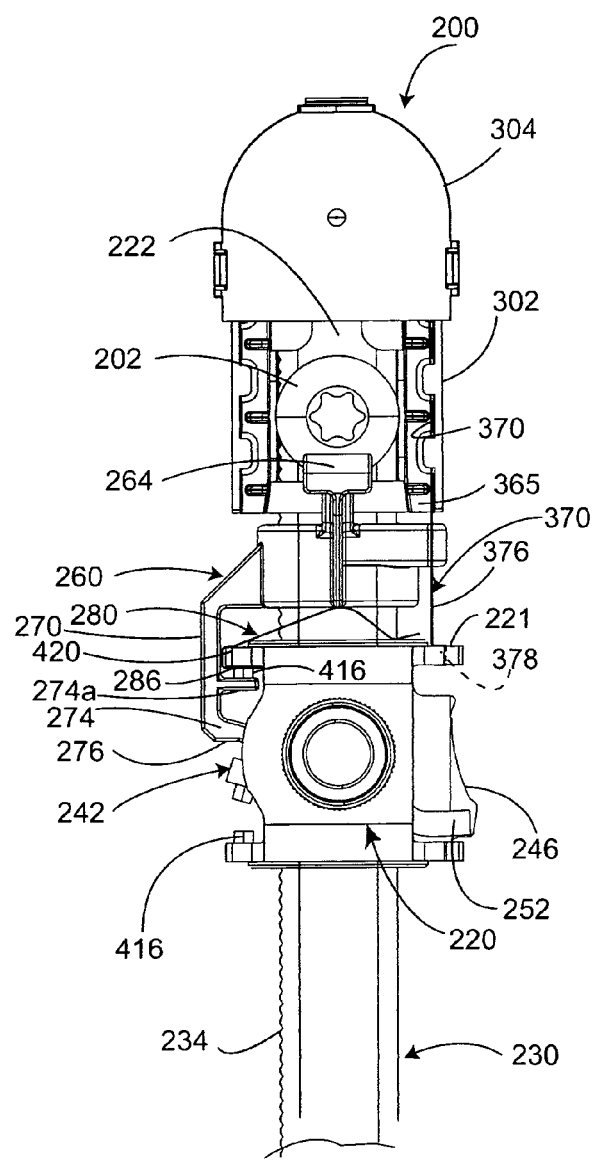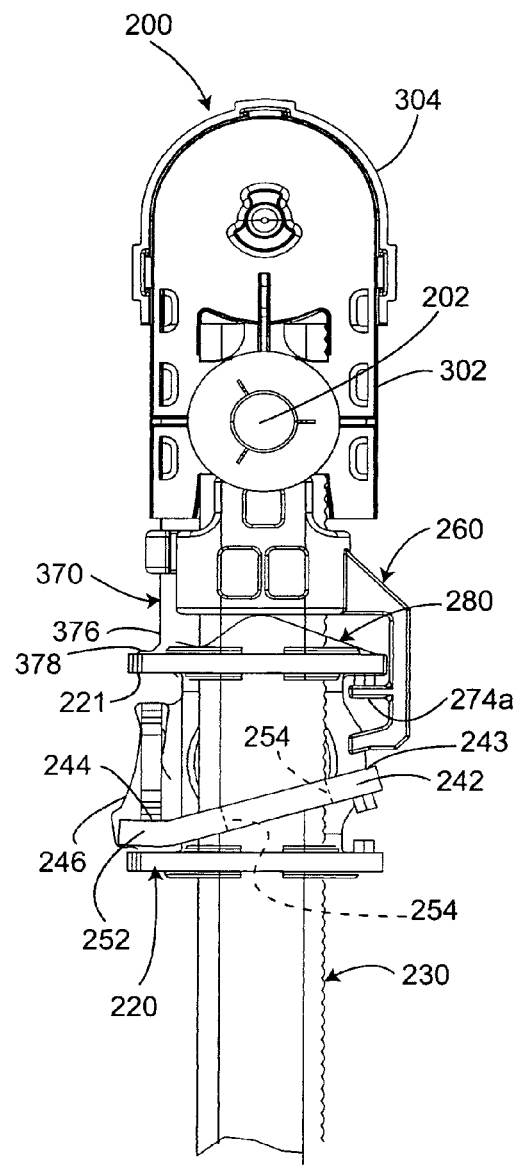
Fig. 2a
Fig. 2c

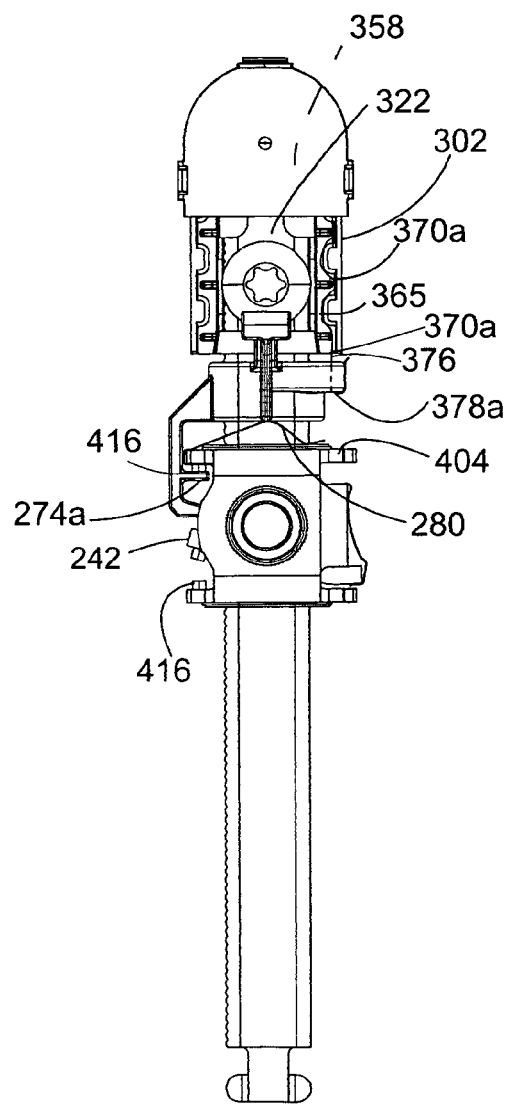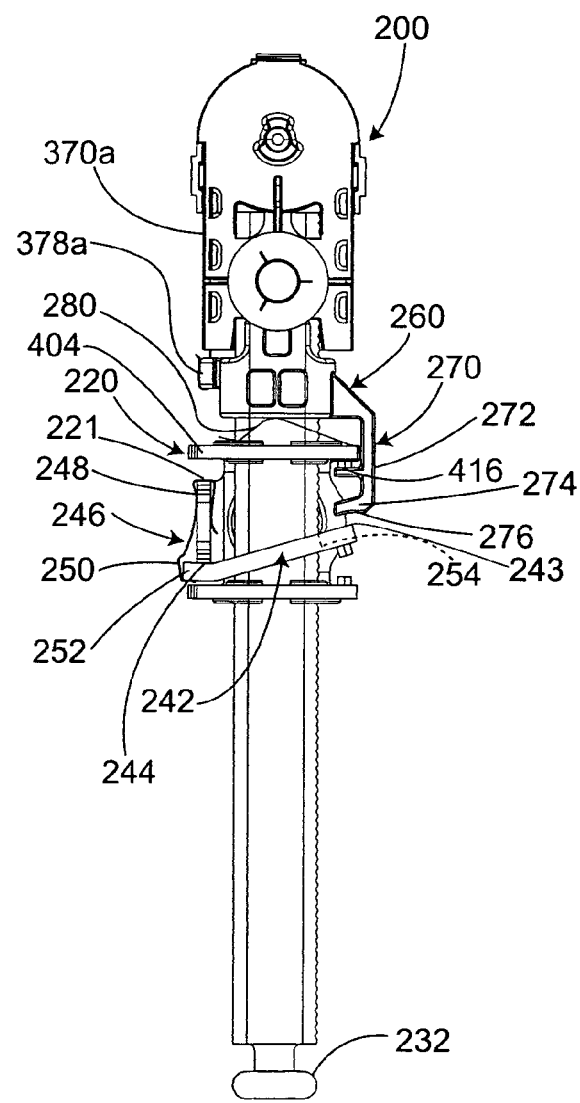
Fig. 2b
Fig. 2d

HEIGHT ADJUSTER WITH RETURN SPRING

BACKGROUND AND SUMMARY OF THE INVENTION

This invention relates to a height adjuster for a safety belt system and more particularly to a height adjuster assembly with a return spring.

Typically, a safety belt or seat belt system for a vehicle has a lap belt and a shoulder belt. The safety belt is anchored to a vehicle at three different locations around a passenger. Two anchors secure the lap belt while a third anchor or D-ring (also referred to in the art as loop or web guide) provides a support for the shoulder belt and is secured to the B-pillar of the vehicle. The D-ring is preferably located just above the shoulder height of the passenger. Due to varying sizes of passengers, manufacturers use a height adjuster assembly to adjust the relative height of the D-ring up or down in relation to the seated occupant. Movement of the height adjuster causes the shoulder belt to cross the occupant's body in a more comfortable position.

A rail or track portion of the height adjuster assembly is mounted to a B-pillar of the vehicle. When the assembly is unlocked, the web guide is movable vertically to its desired position. A release button is provided, typically as part of the vehicle interior trim. Pressing this button to an actuated position such as downward or inward, unlocks a locking mechanism of the height adjuster assembly and permits manual or powered movement of the web guide up and down the tracks to another vertical position.

The height adjuster assembly, and more particularly the D-ring, supports the weight of the shoulder belt and additionally reacts to and supports the force generated by the reaction spring of a cooperating seat belt retractor. Consequently, a passenger wishing to move the position of the web guide (D-ring) upward must overcome the downward force of the seat belt retractor return spring and the weight of the seat belt and the movable components. It would be desirable to facilitate the lifting of the height adjuster.

A need therefore exists for a device that both assists a passenger in the lifting of the height adjuster assembly and returns the button of the assembly to its original position without increasing the number of components. The prior art shows the use of a coiled spring as a return spring with one end of the spring connected to a movable carrier and the coil of the spring loosely mounted upon a track. U.S. Pat. No. 4,652,012 shows the use of an assist spring also formed into a coil with a coiled end and a distal end. The distal end of the spring is fixed to a track while the spring coil and the coiled end are loosely supported by a carrier that is movable vertically along the track; the coiled end is permitted to rotate as the spring extends and retracts. By not fixing the coiled end, height adjusters of the prior art display a greater hysteresis and variability of performance than found in the present invention.

Accordingly the present invention comprises: a height adjuster for a vehicle safety restraint comprising: a rail for providing a vertical path guide for a carrier; the carrier configured to be vertically movable along the rail to one of a plurality of locations, the carrier also configured to rotationally support the web guide; a lock mechanism movable between a locked and an unlocked condition, when in a locked condition the carrier is prohibited from moving down the rail and when in an unlocked condition the carrier is free to be moved; and a return spring mechanism comprising a coiled return spring having an interior or coiled end and a distal end, the internal or coiled end is configured not to move and is secured to the spring arbor; the distal end of the return spring secured to one of the movable carrier or a movable release mechanism.

Many other objects and purposes of the invention will be clear from the following detailed description of the drawings.

BRIEF DESCRIPTION OF THE DRAWINGS

FIG. 2a is a front plan view of the present invention.

FIG. 2b is a rear plan view of the embodiment of FIG. 2a.

FIG. 2c is a front plan view of an alternate embodiment.

FIG. 2d is a rear plan view of the embodiment of FIG. 2b.

DETAILED DESCRIPTION OF THE DRAWINGS

Figure 1:
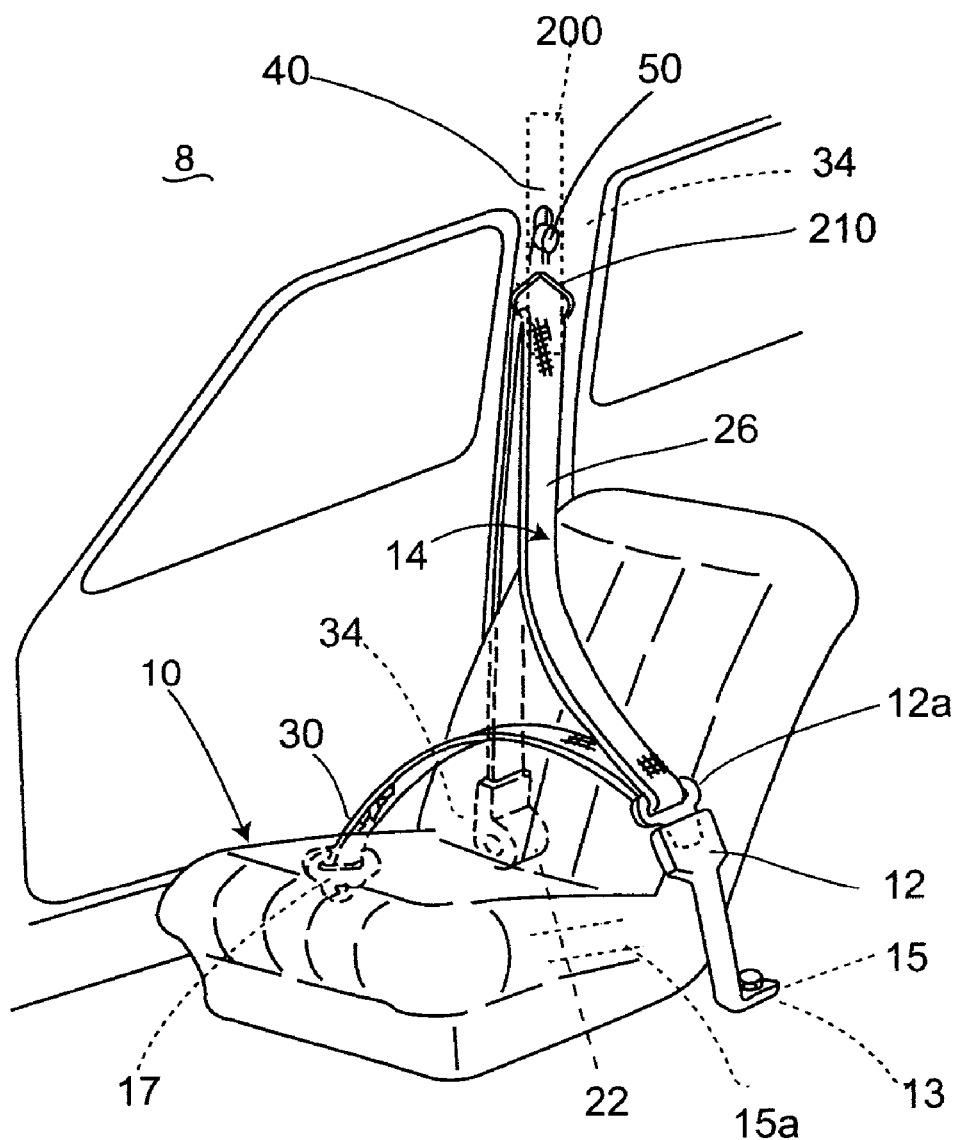
FIG. 1 illustrates a safety restraint system incorporating the present invention.
Figure 2:
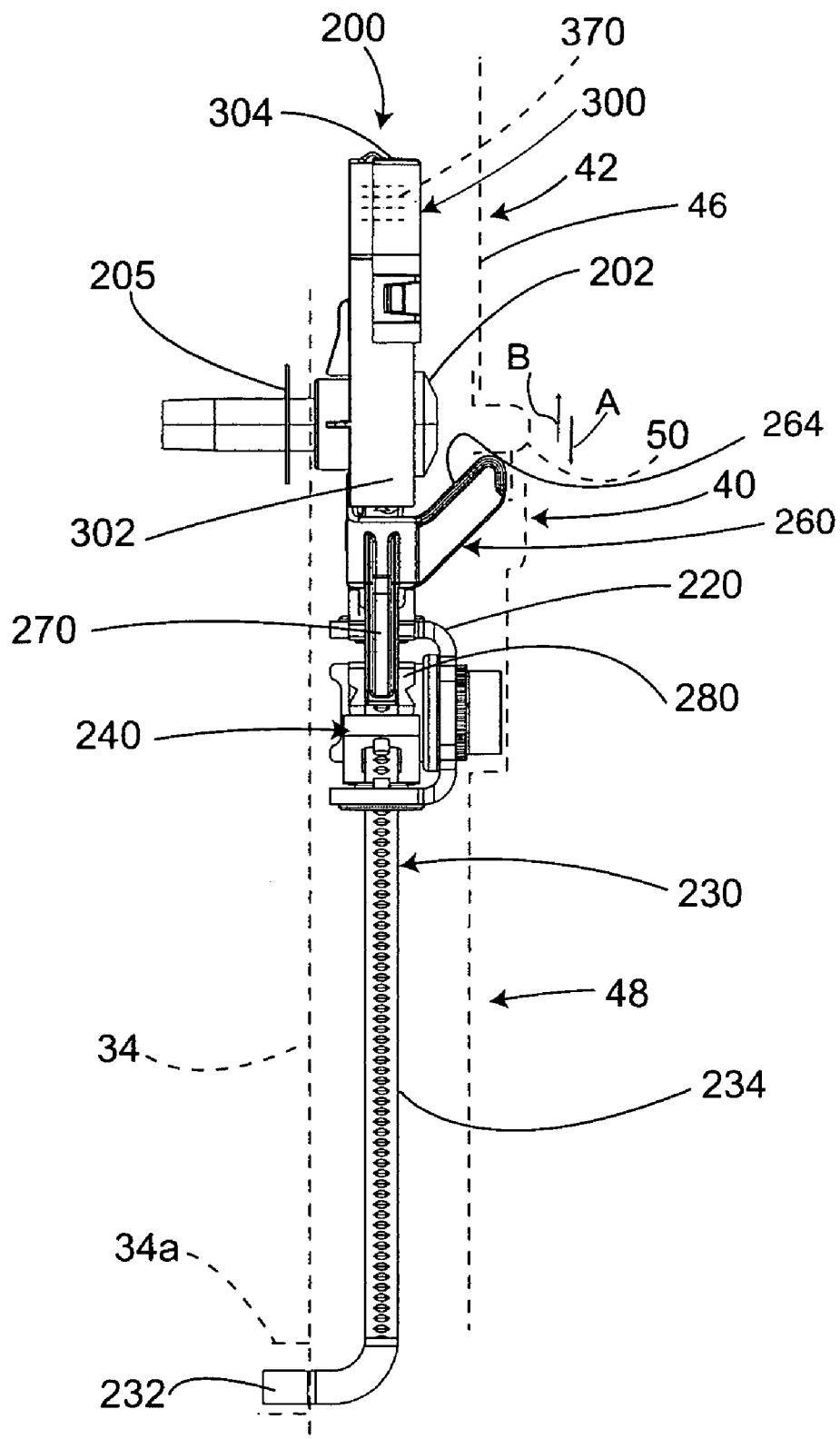
FIG. 2 illustrates a side view of the height adjuster of FIG. 1 and diagrammatically illustrates its installation in the vehicle.
Figure 3:
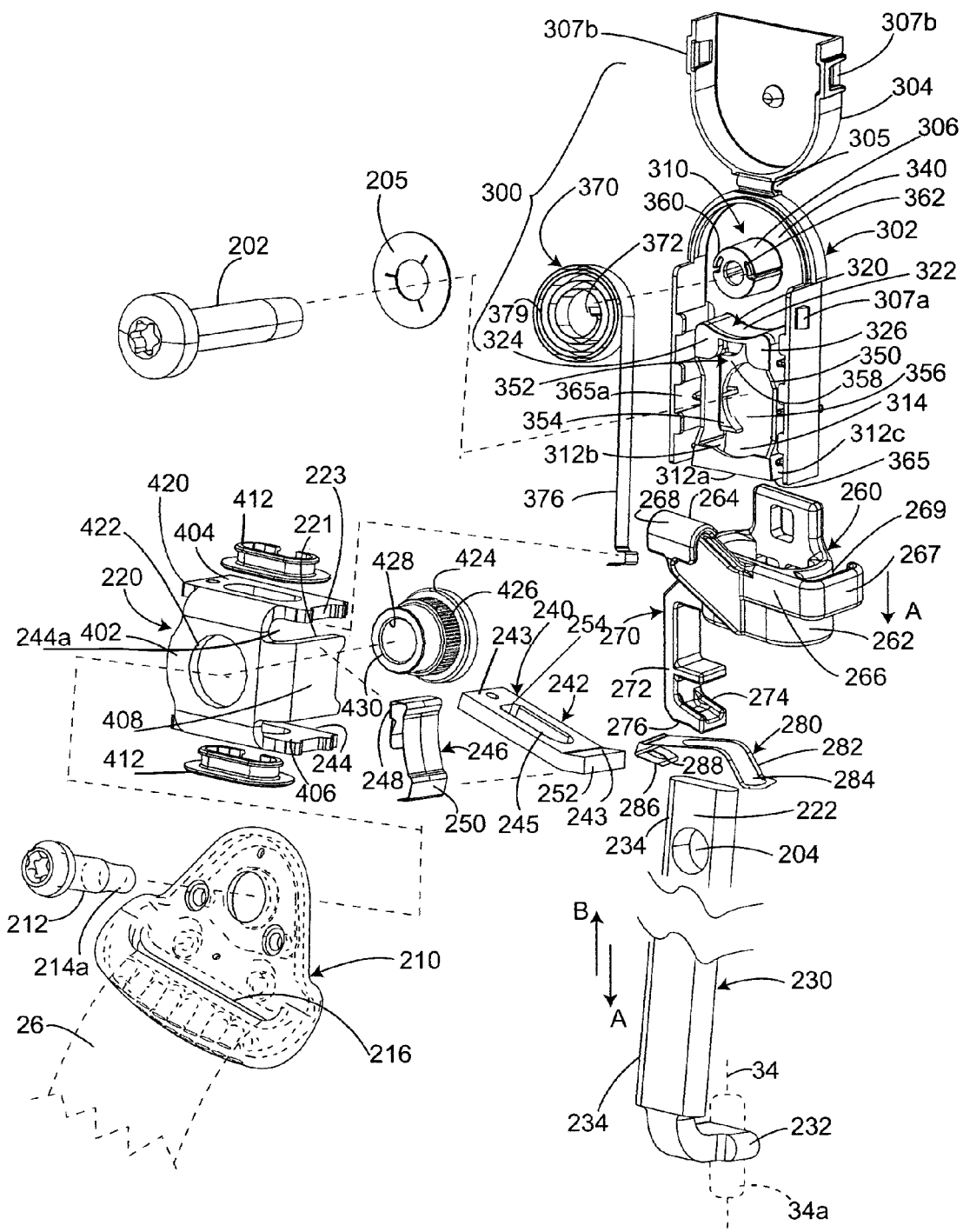
FIG. 3 is an exploded view of a first embodiment of the present invention.

FIGS. 1-3 illustrate a three-point safety restraint system 8. The system 8 includes a number of components known in the art, as well as the new height adjuster assembly 200 of the present invention. The safety restraint system 8 comprises a seat belt buckle 12 secured to a structural member of the vehicle through an anchor 13. Anchor 13 may be secured to the vehicle 15 or alternatively to the frame 15a of seat 10. The system 8 further includes a seat belt 14 having a shoulder belt portion 26 and a lap belt portion 30. The lap belt portion 30 is secured to the floor or seat frame via other anchor 17. A tongue 12a is slidingly secured to the seat belt and lockingly engages with the buckle 12. The shoulder belt 26 is slidably received through a web guide (D-ring) 210, which is part of a fully assembled height adjuster assembly 200; as will be shown, the web guide 210 is vertically movable upon a rail 230. In this way, web guide 210 may be adjusted in height to accommodate differently sized vehicle occupants.

FIG. 2 shows a view of B-pillar trim panel 42 of FIG. 1. B-pillar trim panel 42 comprises fixed base 48 and sliding cover 46. Button 50 is movable in the direction of arrow A or B to manually (or electrically) position an actuator to its activated position. Furthermore, sliding cover 46 is provided with cover opening through which passes seat belt 14 to web guide 210 (not shown in FIG. 2).

The operation and structure of height adjuster assembly 200 will now be explained. Web guide 210 (see FIG. 3) is mounted to carrier 220 by a bolt 212. Height adjuster assembly 200 includes track or rail 230, which is mounted to B-pillar 34 by mounting fastening bolts such as 202 received within openings 204 in the rail 230. Carrier 220 is slidably received on track 230 and movable in the direction of either arrow A or arrow B.

A lock mechanism 240 releasably holds the carrier 220 in place on the lock rail 230. The locking mechanism is shown in FIG. 3 as well as in other figures. One such carrier, rail and lock mechanism is shown in the commonly owned U.S. Pat. No. 6,733,041 B2 to Arnold, et al., which is incorporated herein by reference. The lock mechanism 240 of FIG. 3 (and in the above patent) comprises a spring-loaded lever 242 pivotably mounted within the carrier 220. Numeral 244 generally identifies the location of the lever pivot formed by portions of carrier 220. In the present invention, top end 248 of spring 246 is clipped to a top edge of wall 221 of carrier 220 while an opposing end 250 of spring 246 is formed into a hook and hooked to or clipped to end 252 of lever 242 and provides an upward bias to end 252 of lever 242, urging the lever into contact with a lower portion of wall 221 at pivot point or pivot region 244. This upward bias causes the locking portion 254 formed at a top corner of lever 242 to move away from a locking portion or side 234 of lock rail 230. With the locking portion 254 of the lock lever 242 maintained out of engagement with the locking rail 230, the carrier is free to be moved by the user (or automatic control system if used) up and down on the lock rail. Further, by maintaining the locking portion out of engagement with the lock rail high levels of audible noise are not generated as the lever 242 is prevented from ratcheting on the rail 230. Lever 242 includes an opening 245 through which the rail is received.

Figure 5:
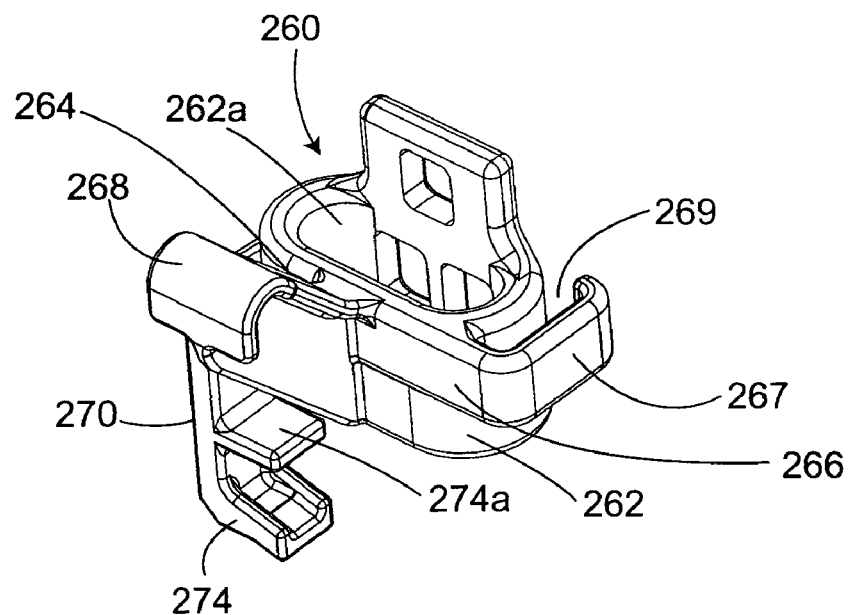
FIG. 5 illustrates the major features of an actuator.

The height adjuster 200 additionally includes a release actuator 260 (also shown in FIG. 5). The actuator 260 provides a link between a release button 50 and the lock lever 242 as illustrated in many of the figures. The actuator 260 includes a hollow upper body 262, having a bore 262a, that is slidably received about the lock bar 230. Actuator 260 further includes a rearwardly extending leg 267 that is spaced from a side of body 262. This spacing is designated by numeral 269. The rear end of leg 267 is shown in FIG. 3 as being separate from the body 262. As can be appreciated, an additional leg or section (not shown) can be added to leg 267, attaching the rear portion of leg 267 to body 262 to provide additional strength to leg 267. A fixed lever 264 protrudes from a surface 266 of the upper body 262. A tip 268 of lever 264 protrudes within the trim 42 and contacts the undersurface of button 50. As can be appreciated, the button 50 can be secured directly to the actuator or be a part thereof. For example, the button can be linked to lever 264. Alternately, the lever can be configured as the button or a portion thereof or vice versa. In this embodiment, the lever 264 is extended through the trim and accessible directly by the user.

As can be seen more clearly in FIGS. 2, 2a and 3, actuator 260 further includes an activation link 270. Link 270 includes a first leg portion 272 that extends parallel to rail 230 and an inwardly directed lower extension 274. A lower surface 276 of extension 274 provides an activation surface, which engages an upper surface 243 of lever 242, pushing the lever down to its release position away from side 234 of rail 230. A bias spring 280, shown in greater detail in FIG. 3, is positioned between the carrier 220 and the actuator 260. Spring 280 biases actuator 260 and rail 230 upwardly relative to the carrier 220.

Actuator 260 further includes another extension 274a positioned above extension 274. Extension 274a provides for another mechanical connection such as an upward motion stop, for actuator 260, between actuator 260 and carrier 220. Carrier 220 includes four main sides or faces: a front face 402, a top 404, a bottom 406 (having another slot 223), and a side 408. As can be appreciated, upward and downward motion of the carrier and/or actuator is transferred therebetween by the interaction of extension 274a with carrier 220. The top 404, bottom 406, and side 408 are each rearwardly directly relative to the front face 402. Portions of the top, bottom and side 408 are separate from one another. As previously mentioned, there exists a spacing 244 between the bottom 406 and side 408, which receives end 252 of lever 240, which provides the pivot or pivot region. Carrier 220 additionally includes another spacing 244a that can be used to receive end 252 of lever in the situation where the carrier is rotated 180 degrees from the orientation shown in FIG. 3 or 3a. As can be further appreciated, this rotation interchanges the functionality of the top 404 and bottom 406 of carrier 220. Each of the top 404 and bottom 406 includes an opening 410. Each opening receives an optional respective bushing 412. The rail 230 is slidably received through the central opening 414 of each bushing 412.

Reference is briefly made to any of FIGS. 2a-2d. The undersurface or inside surface of each of the top 404 and bottom 406 includes an inwardly extending cylindrical projection 416.

As can be seen in the various figures, spring 280 is positioned between the actuator 260 and the carrier 220. The spring 280 includes a body 282, see FIG. 3, having a central opening 284 through which the rail 230 slidably extends. One end of the body is bent, forming a clip 286 that is received around end 420 of top 404. If the carrier is rotated 180 degrees for use with height adjusters mounted to another side of the vehicle, the end 286 of spring 280 will be mounted about the corresponding end 420 of the reoriented bottom. Opening 288 is received about the cylindrical projection 416 of carrier 220, which secures spring 280 in place. Two pins 416 are shown extending from an inner surface of each of the top and bottom of the carrier 220.

As previously mentioned, the D-ring or web guide 210 is secured to carrier 220 by shoulder bolt 212. The carrier 220 in its front face 402 includes opening 422 for receipt of a threaded bushing 424 that is press-fit within opening 422 utilizing splines 426. A central bore 428 of bushing 424 includes threads 430 for receipt of a threaded end 214a of bolt 212. The height adjuster 200 is installed in the B-pillar 34, see FIG. 3, in the following manner. B-pillar 34 includes a vertically shaped opening 34a. The rail 230 is rotated 90 degrees relative to the B-pillar so that the enlarged, horizontally extending end 232 fits within the vertical opening 34a. Thereafter, the rail is rotated vertically to its desired position relative to B-pillar 34. Bolt 202 is received through opening 204 of the rail and is threadably secured to a corresponding opening or nut of the B-pillar.

Reference is again briefly made to FIG. 3 and more particularly to D-ring 210. The D-ring 210 further includes a narrow slit 216 through which the shoulder belt portion 26 of seat belt 14 is received.

In the embodiment shown in FIG. 2, downward movement of the actuator 260 is caused by the movement of button 50 to its actuation position. Downward movement of the actuator 260 causes surface 276 to engage surface 243 of rotating lever 242 in a clockwise manner (in the context of FIGS. 2c and 2d). This rotation removes the lock surface 254 from corresponding engagement surface 234 of the lock rail 230, thereby permitting upward or downward movement of the carrier 220, the web guide 210 and that portion of the shoulder belt 26 received through the web guide. As can be appreciated, in other embodiments of the invention the trim 42, of which button 50 is a part, need not be used. In these embodiments, the fixed lever 264 can be moved downwardly by direct contact with a finger of the occupant.

Thus, movement of button 50, in the direction of arrow A, causes movement of actuator 250 in the same direction to unlock locking mechanism 240 and to permit carrier 220 to be moved up or down. Upon release of the release button 50 or upon release of the lever 242, bias spring 246 will return lock lever 242 to an unlocked position.

As mentioned above the height adjuster 200 is subject to a downward tensioning force from seat belt retractor 22 and from the weight of the shoulder belt portion 26, and the weight of the height adjuster components. The direction of this downward force is in the direction of arrow A. Accordingly, an individual wishing to move the D-ring (and carrier and shoulder belt) loop 210 upwardly in the direction of arrow B must overcome this downward force. To facilitate the lifting of sliding cover 46 and web guide 210, a lift spring assembly 300 is incorporated into the height adjuster 100.

Figures 4A, 4B:
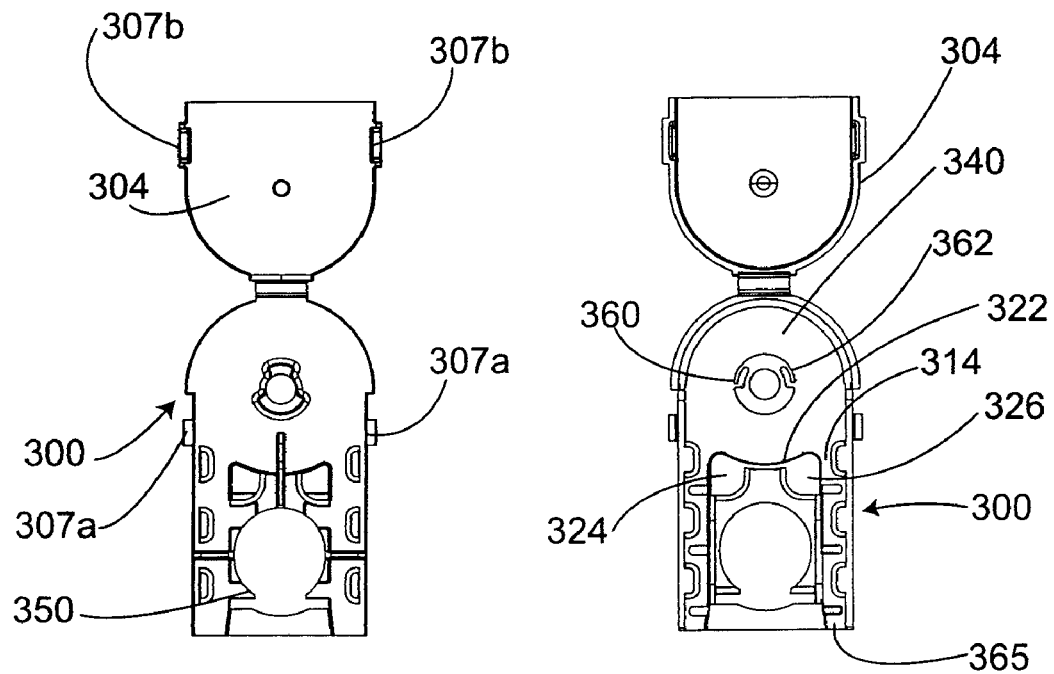
FIG. 4a is a front plan view of a spring cassette.
FIG. 4b is a rear plan view of a spring cassette.

Reference is made to FIGS. 3, 4a and 4b, which show the details of the lift spring assembly 300. The assembly 300 comprises a spring support member or cassette 302, a front cover 304 (of the cassette 302), a spring arbor 306, and a coiled lift spring 370. As illustrated, cover 304 is hinged to cassette 302 at hinge 305. As can be appreciated, the cover can be a separate piece or hinge on another side. The cover and cassette include interlocking, snap-action components 307a,b to permit the cover to lock onto the cassette (support member). The spring support member or cassette 302 includes a structure 310 having walls 312a, 312b and 312c, which form an opening wall or railing 314 through which the top end 222 of the bar 220 is slidingly received and captured. The internal structure further includes a support and a stop structure 320 having an arcuate top wall 322, which forms part of the spring cavity 340 and two spaced-apart front walls or wall sections 324 and 326 that depend from the front edge of wall 322. Positioned rearward of walls 324, 326 and railing 314 is a fastener-receiving structure generally identified by numeral 350. Fastener-receiving structure 350 includes a body 352 having a front wall 354 and opening 356 formed within body 352 to receive and guide the shank of one of the mounting fasteners 202. A split spring washer 205 is used to secure the fastener 202 to the height adjuster 200 after the fastener 202 is fit through the cassette and bar (see FIG. 2). The walls 324, 326, 314 and 354 cooperate to define a cavity 358 into which the top 222 of the lock bar 230 is received, as can be seen in FIG. 2.

The spring arbor 306 includes opposing slots 360 and 362. Each slot is the mirror image of the other enabling a single spring support assembly to be used for height adjusters mounted to the right and to the left side of the vehicle passenger compartment. The coil spring 370 is adapted to be fitted to and within the spring support 302. More particularly the spring 370 includes an inner bent end 372 received and anchored within slot 362. The spring includes a plurality of coils 379 fitted within the spring cavity 340 about the spring arbor 306. The spring further includes an extending leg 376 threaded through a slot 365 formed in the support 302. The end of leg 376 is configured into a rectangularly shaped holder or clip 378 that is received within a notch 223 in the top 404 of carrier 220 to upwardly bias the carrier 220 (and all of those components attached thereto). As can be appreciated, the spring 370 is anchored at the spring arbor 306 on one hand and anchored at the carrier on the other.

Figure 3A:
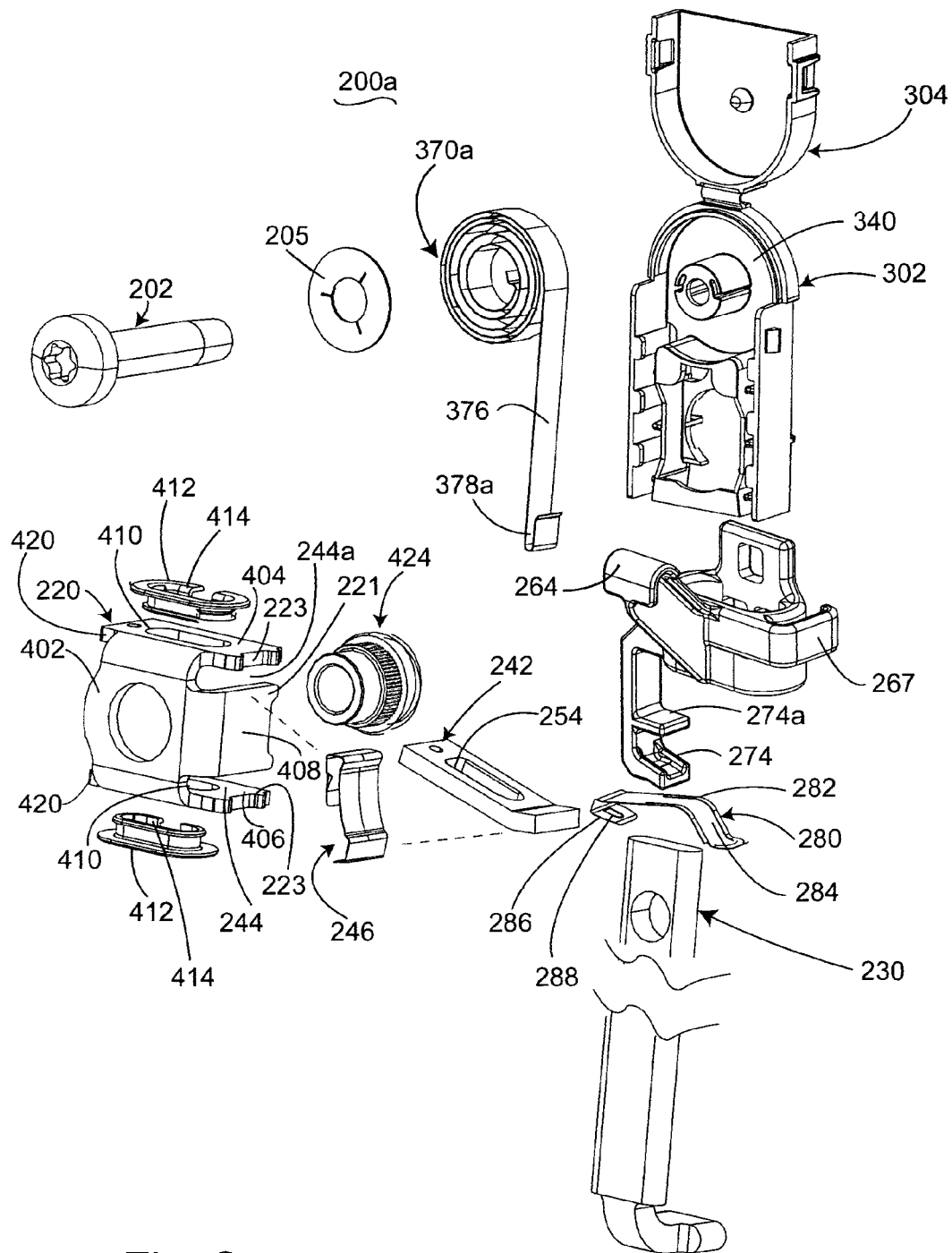
FIG. 3a shows an alternate embodiment of a height adjuster utilizing a spring secured to an actuator member.

Reference is briefly made to FIG. 3a, which illustrates an alternate embodiment of height adjuster 200a. The primary difference between height adjuster 200 and 200a is in the way spring 370a is terminated. More particularly, leg 376 of spring 370a includes an upward end, clip or detent 378a. Spring 370a is received, as before, within spring cavity 340; leg 376 is threaded through slot or passage 365. However, clip 378a is received about leg 267 (as also shown in FIGS. 2b and 2d) and upwardly biases the actuator 260. As can be appreciated, in as much as actuator 260 is mechanically coupled to carrier 220 via a lower extension 274 and upward extension 274a, the upward movement of actuator 260 will be transferred to the carrier 220.

The operation of height adjuster 200 is as follows. When a user thereof decides to move the height adjuster to a different vertical position on rail 230, the user depresses button 50 of trim part 48. Movement of button 50 urges actuator 260 downwardly. Motion of actuator 260 via extension 274 rotates lock lever 240 away from rail 230, thereby permitting the carrier 220, actuator 260 and button 50 to be moved to a new vertical orientation and position upon rail 230. As previously mentioned, the upward efforts of the user are assisted by coil spring 370 (370a), which upwardly biases carrier 220 (or actuator 260).

The upward force on carrier 220 or, alternatively, the upward force on actuator 260 is imparted by the bias force of springs 370 or 370a by respectively securing the remote ends of these springs to the carrier or to the actuator. As previously mentioned, inner end 372 of the spring is secured within slot 362 of spring arbor 306. This construction provides the following benefits not found in the prior art which are: the reduction of hysteresis, a smoother and more uniform performance, a more constant force applied to the carrier (or actuator) through the range of motion of the carrier and the ability to tune (or control) the lift force created by the return spring by choice of spring length and number of turns.

Many changes and modifications in the above-described embodiment of the invention can, of course, be carried out without departing from the scope thereof. Accordingly, that scope is intended to be limited only by the scope of the appended claims.

The invention claimed is:

1. A height adjuster for a vehicle safety restraint comprising:
   a web guide;
   a rail for providing a vertical path guide for a carrier;
   the carrier configured to be vertically movable along the rail to one of a plurality of locations, the carrier also configured to rotationally support the web guide;
   a lock mechanism movable between a locked and an unlocked condition, when in a locked condition the carrier is prohibited from moving down the rail and when in an unlocked condition the carrier is free to be moved;
   a release mechanism operatively connectable to said lock mechanism, said release mechanism having a released position disengaged from the lock mechanism and an engaged position in contact with the lock mechanism for moving the lock mechanism to the unlocked condition; and
   a return spring mechanism for at least partially assisting vertical movement of the carrier and components carried by the carrier, the return spring mechanism including a spring cassette fixable to the rail, the spring cassette having a spring arbor therein and a coiled return spring, an internal end of the return spring secured in non-rotating engagement to the spring arbor, and a distal end of the return spring secured to one of the carrier and release mechanism.

2. The height adjuster of claim 1 wherein the release mechanism includes an actuator movable upon the rail.

3. The height adjuster of claim 2 wherein a separation spring interposes the carrier and the actuator and is operatively connectable to said web guide and to said release mechanism.

4. The height adjuster of claim 2 wherein the actuator includes a body with an opening for receipt of the rail, a projection configured to interface with a release button movable by a user of the height adjuster and wherein the carrier is configured to receive the distal end of the return spring.

5. A height adjuster for a vehicle safety restraint comprising:

a rail for providing a vertical path guide for a carrier, the rail having an oval cross-sectional shape, the rail having a first end and a second end securable to portions of the vehicle;

the carrier enveloping the rail and configured to be vertically movable along the rail to one of a plurality of locations, the carrier also configured to be operatively connected to a web guide;

a lock mechanism movable between a locked and an unlocked condition, when in a locked condition the carrier is prohibited from moving down the rail and when in an unlocked condition the carrier is free to be moved; and a return spring mechanism comprising a spring housing received upon the first end of the rail, the spring housing and the first end of the rail secured to a portion of the vehicle by the same fastener, the return spring housing having a coiled return spring having an interior end and a distal end, the interior end configured not to rotate as the carrier is moved and a distal end of the return spring secured to and movable with one of the carrier and a release mechanism.

6. The height adjuster of claim 5 including a spring arbor and wherein the interior end of the return spring is secured to the spring arbor in a non-rotational manner.

7. The height adjuster of claim 6 including a seat belt retractor for retracting a seat belt, a portion of which is received within a web guide carried by the carrier.

8. A height adjuster for a vehicle safety restraint comprising:

a rail for providing a vertical path guide for a carrier, the rail having an oval cross-sectional shape, the rail having a first end and a second end securable to portions of the vehicle;

the carrier enveloping the rail and configured to be vertically movable along the rail to one of a plurality of locations, the carrier also configured to be operatively connected to a web guide;

a lock mechanism movable between a locked and an unlocked condition, when in a locked condition the carrier is prohibited from moving down the rail and when in an unlocked condition the carrier is free to be moved; and a return spring mechanism comprising a spring housing received upon the first end of the rail, the spring housing and the first end of the rail secured to a portion of the vehicle by the same fastener.

9. A height adjuster according to claim 8 wherein the spring housing has a coiled return spring having an interior end and a distal end, the interior end configured not to rotate as the carrier is moved and a distal end of the return spring secured to and movable with one of the carrier and a release mechanism configured to move the lock mechanism to the unlocked condition.

* * * * *